United States Patent
Thomas

(10) Patent No.: US 9,707,899 B2
(45) Date of Patent: Jul. 18, 2017

(54) CONSOLE LID INTEGRATED DUAL PAWL LATCHING PACKAGE

(71) Applicant: FORD GLOBAL TECHNOLOGIES, LLC, Dearborn, MI (US)

(72) Inventor: Gregory Paul Thomas, Canton, MI (US)

(73) Assignee: Ford Global Technologies LLC, Dearborn, MI (US)

(*) Notice: Subject to any disclaimer, the term of this patent is extended or adjusted under 35 U.S.C. 154(b) by 0 days.

(21) Appl. No.: 14/875,244

(22) Filed: Oct. 5, 2015

(65) Prior Publication Data

US 2017/0096109 A1    Apr. 6, 2017

(51) Int. Cl.
| | |
|---|---|
| *B60R 7/04* | (2006.01) |
| *B65D 43/16* | (2006.01) |
| *B65D 43/22* | (2006.01) |
| *E05B 83/32* | (2014.01) |

(52) U.S. Cl.
CPC ............ *B60R 7/04* (2013.01); *B65D 43/16* (2013.01); *B65D 43/22* (2013.01); *E05B 83/32* (2013.01)

(58) Field of Classification Search
CPC .......... B60N 2/46; B60N 2/4686; B60R 7/04; B60R 2011/0007; B60R 2011/0014; B65D 43/16; B65D 43/22; E05B 83/28; E05B 83/32
See application file for complete search history.

(56) References Cited

U.S. PATENT DOCUMENTS

| | | | | |
|---|---|---|---|---|
| 1,998,600 | A * | 4/1935 | Weber | B65D 43/16 217/56 |
| 4,273,368 | A | 6/1981 | Tanaka | |
| 4,848,627 | A * | 7/1989 | Maeda | B60R 7/04 108/44 |
| 5,356,025 | A * | 10/1994 | Renault | A45D 40/0068 132/293 |
| 5,397,160 | A * | 3/1995 | Landry | B60R 7/04 224/539 |
| 5,931,336 | A * | 8/1999 | Takeuchi | B60R 7/04 220/836 |

(Continued)

FOREIGN PATENT DOCUMENTS

| | | | | |
|---|---|---|---|---|
| DE | 102007013080 A1 * | 9/2008 | ........... | B60N 2/4646 |
| DE | 102010042061 A1 * | 4/2012 | ............... | B60R 7/04 |
| FR | 2911554 A1 * | 7/2008 | ............... | B60R 7/04 |

*Primary Examiner* — Glenn Dayoan
*Assistant Examiner* — Paul Chenevert
(74) *Attorney, Agent, or Firm* — Vichit Chea; King & Schickli PLLC

(57) ABSTRACT

A vehicle center console assembly includes a console having a side wall dimensioned to receive a bin therein and a bin including a side wall having a top edge including a pair of opposed strikers. A hinged bin lid includes a dual pawl latching mechanism disposed on a bottom surface thereof whereby the dual pawl latching mechanism does not extend beyond an exterior dimension defined by the bin lid. The bin lid may include a pair of opposed bin lid side walls. The latching mechanism is disposed on the bin lid bottom surface whereby a gap is defined between an outer portion of the latching mechanism and an inner portion of the opposed bin lid side walls. The console side wall includes a top edge configured to define a mating surface for the bin lid side walls.

13 Claims, 3 Drawing Sheets

(56) References Cited

U.S. PATENT DOCUMENTS

| | | | |
|---|---|---|---|
| 6,142,333 A * | 11/2000 | Sasamoto | B60R 7/04 |
| | | | 220/263 |
| 6,435,572 B1 | 8/2002 | Ticu et al. | |
| 7,770,953 B2 | 8/2010 | Koarai | |
| 7,980,409 B2 | 7/2011 | Vasko et al. | |
| 8,100,453 B2 * | 1/2012 | Shimajiri | B60N 2/4686 |
| | | | 220/263 |
| 8,740,265 B2 | 6/2014 | Gillis | |
| 8,789,869 B2 * | 7/2014 | Bouldron | B60R 7/06 |
| | | | 292/DIG. 3 |
| 8,943,650 B2 * | 2/2015 | Anderson | B60N 2/4686 |
| | | | 16/330 |
| 9,096,177 B2 * | 8/2015 | Boundy | B60R 7/04 |
| 9,140,044 B2 * | 9/2015 | Singh | E05D 7/02 |
| 9,199,562 B2 * | 12/2015 | Skapof | B60N 2/4606 |
| 2009/0230699 A1 | 9/2009 | Carabalona | |
| 2011/0025074 A1 | 2/2011 | Reznar | |
| 2011/0227359 A1 | 9/2011 | Fesenmyer | |
| 2014/0291372 A1 | 10/2014 | Smith | |
| 2016/0114732 A1 * | 4/2016 | Sawada | B60R 7/04 |
| | | | 224/400 |

\* cited by examiner

CONSOLE LID INTEGRATED DUAL PAWL LATCHING PACKAGE

TECHNICAL FIELD

This disclosure relates generally to vehicle consoles including latching storage bins. More particularly, the disclosure relates to a console lid including an integrated dual pawl latching arrangement.

BACKGROUND

In vehicle consoles including a latching storage bin, typically a latching mechanism is provided to prevent inadvertent opening of the storage bin lid. Most commonly, the latching mechanism is disposed at a front center portion of the storage bin, for example with the latch disposed at a front center portion of the console storage bin lid and the striker disposed at a front center portion of the storage bin. It is also known to provide alternative latching mechanisms such as dual-pawl mechanisms having a pair of pawls disposed on a console storage bin lid and cooperating strikers disposed on the storage bin. Such dual pawl mechanisms provide a more desirable fit and finish, i.e. a tighter fit, to the console storage bin lid, improving customer acceptance.

However, dual pawl mechanisms typically require a greater packaging space than single, center-mounted pawl latching mechanisms in order to ensure proper striker engagement. For this reason, a portion of the dual pawl latching package must typically extend below a plane defined by the console lid in order to properly engage the storage bin-mounted strikers. This is illustrated in FIG. 1A, showing a vehicle center console 100 including a storage bin 102, a hinged lid 104, and a dual pawl mechanism 106 depending from an underside of the lid 104. As shown in FIG. 1B, the dual pawl mechanism 106 package extends below a plane P defined by an underside of the storage bin lid 104. While providing the desired engagement of pawl and striker, this creates an undesirable protrusion extending below the bin lid 104.

To solve this and other problems, the present disclosure relates at a high level to a storage bin and hinged lid for use in, e.g., a vehicle console. The described console storage bin and lid include a dual pawl latching mechanism. By the design of the hinged lid and cooperating storage bin, the dual pawl mechanism is substantially integrated into the lid, thus avoiding the undesirable protrusion described above.

SUMMARY

In accordance with the purposes and benefits described herein, in one aspect a storage bin for a vehicle is provided, including a bin defined by a floor and a side wall having a top edge including a pair of opposed strikers. A hinged bin lid is provided having a dual pawl latching mechanism disposed on a bottom surface thereof. The lid and latching mechanism are dimensioned and disposed whereby the latching mechanism does not extend beyond an exterior dimension of the hinged bin lid. In embodiments, the storage bin lid may include a pair of opposed side walls and the dual pawl latching mechanism is disposed on the hinged storage bin lid bottom surface whereby a gap is defined between an outer portion of the latching mechanism and an inner portion of the opposed side walls. That gap is dimensioned to snugly receive the bin top edge therein when the hinged storage bin lid is translated to a closed configuration whereby the dual pawls engage the opposed strikers.

In another aspect, the present disclosure provides a vehicle center console assembly. The assembly includes a console including a console side wall dimensioned to receive the storage bin described above. In embodiments, the console side wall includes a top edge configured to define an included angle relative to the bin top edge and the bin lid side walls are configured to define a same included angle as the console side wall top edge. Thus, the console side wall defines a mating surface for the bin lid side walls.

In the following description, there are shown and described embodiments of the disclosed storage bin lid-integrated dual pawl latching mechanism. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed console lid-integrated dual pawl latching mechanism, and together with the description serve to explain certain principles thereof. In the drawings.

Reference will now be made in detail to embodiments of the disclosed storage bin lid-integrated dual pawl latching mechanism, examples of which are illustrated in the accompanying drawing figures wherein like reference numerals identify like features.

DETAILED DESCRIPTION

Preliminarily, the descriptions and drawing figures herein are primarily directed for convenience to a vehicle center console having a storage bin with a hinged lid and dual pawl latching arrangement. However, it will be appreciated that the descriptions should not be taken as limited to a center console, and that the described integrated dual pawl latching arrangement is readily adaptable to any vehicle console or other storage bin including a latching lid.

Figure 1A:
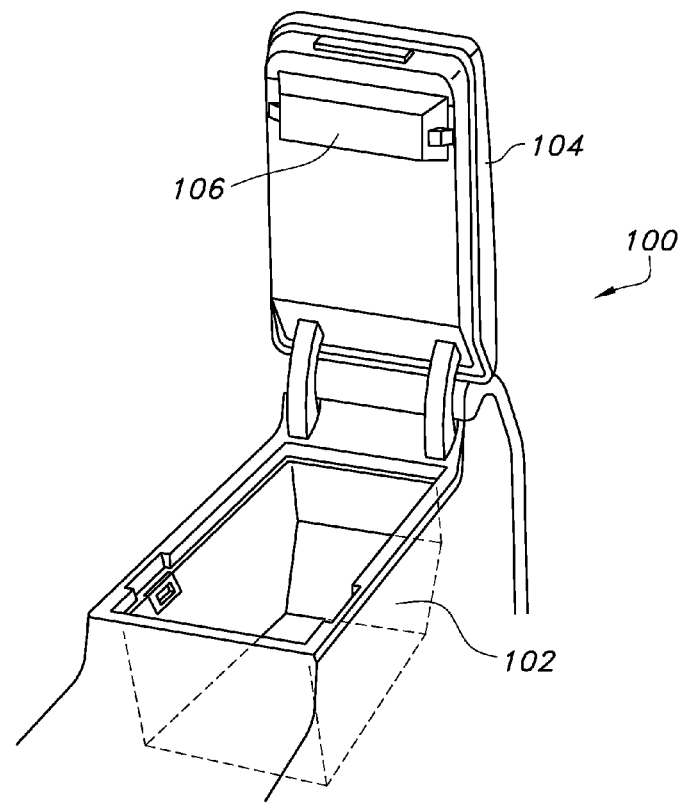
FIG. 1A depicts a prior art latching storage bin for a vehicle console, including a dual pawl latching mechanism.
Figure 1B:
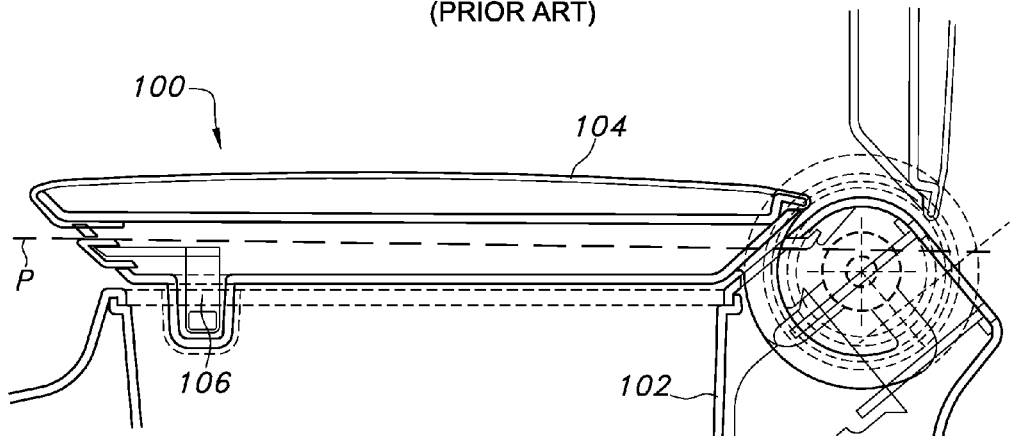
FIG. 1B is a side view of the storage bin of FIG. 1A.
Figure 2A:
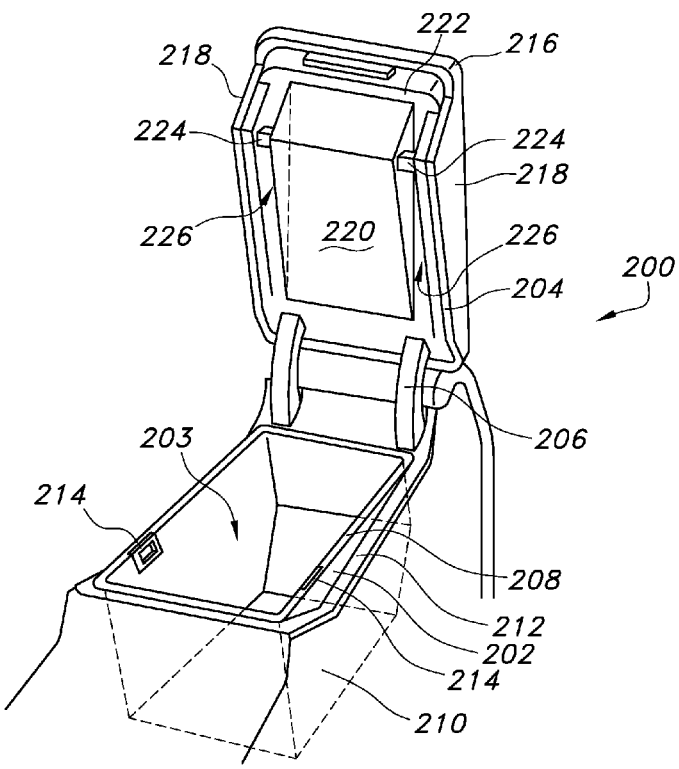
FIG. 2A is a front perspective view of a vehicle center console including a storage bin and latching lid according to the present disclosure.

FIG. 2A illustrates a vehicle center console 200 according to the present disclosure, including a storage bin 202 having at least side walls and a floor defining a storage area 203, and a cooperating latching lid 204 operatively connected thereto by one or more hinges 206. Any number of suitable hinge structures are known in the art for such use, and are contemplated for use herein. The storage bin 202 includes a top edge 208 extending above a console wall 210. A top edge 212 of the console wall 210 defines a surface configured to mate with a portion of the hinged latching lid 204 as will be described. The storage bin top edge 208 also includes a pair of strikers 214 disposed thereon to engage a dual pawl latching mechanism as will be described.

The latching lid 204 includes a top surface 216 and opposed side walls 218 depending therefrom. A latching mechanism 220 is disposed on a lid bottom surface 222 and including a pair of opposed pawls 224 disposed whereby on translating the lid 204 to a closed configuration each pawl 224 will engage a cooperating striker 214. A gap 226 is defined between the latching mechanism 220 and the latching lid side walls 218, configured to receive the storage bin top edge 208 therein.

Figure 2B:
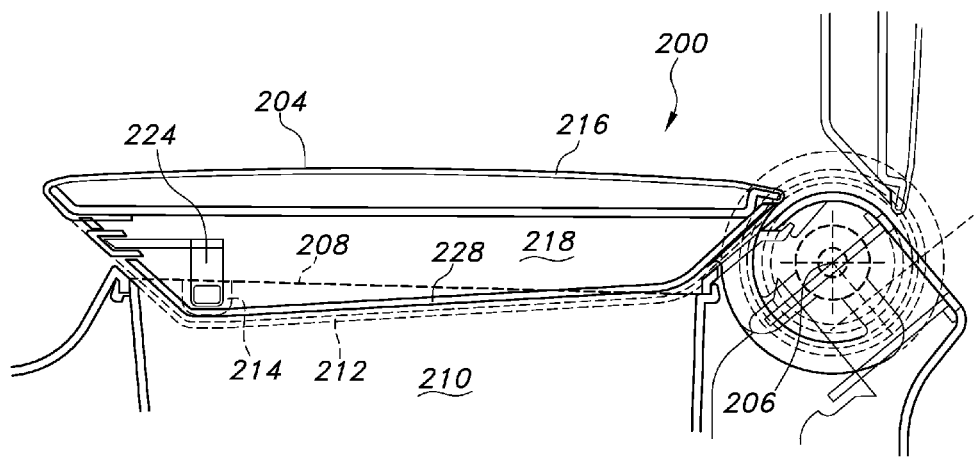
FIG. 2B is a side view of a portion of the storage bin and lid of FIG. 2A.
Figure 2C:
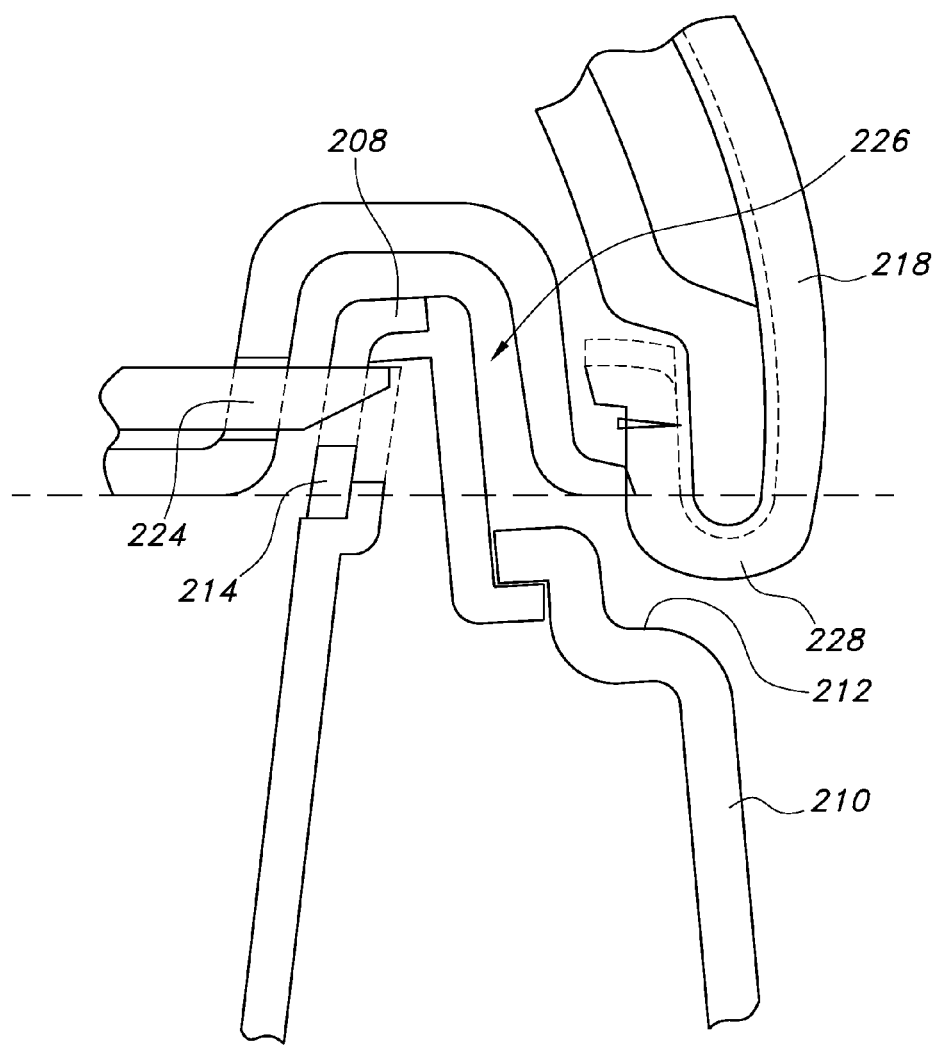
FIG. 2C depicts the pawl and striker arrangement of the storage bin and lid of FIG. 2A.

With reference to FIG. 2B, in an embodiment the console wall top edge 212 defines an included angle to the storage bin top edge 208. Likewise, a bottom edge 228 of the latching lid side wall 218 defines an included angle corresponding to the configuration of the console wall top edge 212, to provide a mating surface therebetween. As shown, the entirety of the latching mechanism 220 is contained within a footprint defined by the latching lid 204. This is further illustrated in FIG. 2C, where as shown the storage bin top edge 208 is matingly received within the gap 226 defined between the latching mechanism 220 and the latching side walls 218 when the lid 204 is translated to the closed configuration whereby the lid-mounted pawls 224 engage the storage bin-mounted strikers 214. As shown, no portion of the latching mechanism 220, including pawls 224, depends below a plane (see broken line) defined by the bottom edge 228 of the latching lid side wall 218.

Thus, by the present disclosure a vehicle console storage bin and latching lid are provided, including a dual pawl mechanism that is substantially integral to the lid footprint, providing the desirable fit and finish of a dual pawl latch and also an attractive, integrated console storage bin latching package that finds consumer acceptance.

Obvious modifications and variations are possible in light of the above teachings. All such modifications and variations are within the scope of the appended claims when interpreted in accordance with the breadth to which they are fairly, legally and equitably entitled.

What is claimed:

1. A vehicle console assembly, comprising:
   a bin defined by a floor and a bin side wall having a top edge including a pair of opposed strikers;
   a console including a console side wall dimensioned to receive the bin therein, the console side wall including a top edge configured to define an included angle relative to the bin top edge; and
   a hinged bin lid configured for raising and lowering in a vehicle fore-aft direction and having a dual pawl latching mechanism disposed on a bottom surface thereof;
   wherein the dual pawl latching mechanism does not extend beyond an exterior dimension defined by the bin lid.

2. The assembly of claim 1, wherein the bin lid includes a pair of opposed bin lid side walls.

3. The assembly of claim 2, wherein a gap is defined between an outer portion of the latching mechanism and an inner portion of the opposed bin lid side walls.

4. The assembly of claim 3, wherein the gap is dimensioned to snugly receive the bin top edge therein whereby the dual pawls engage the opposed strikers when the bin lid is translated to a closed configuration.

5. The assembly of claim 2, wherein the bin lid side walls are configured to define a same included angle as the console side wall top edge included angle.

6. The assembly of claim 5, wherein the console side wall defines a mating surface for the bin lid side walls.

7. A vehicle including the assembly of claim 1.

8. A vehicle center console assembly, comprising:
   a console including a console side wall dimensioned to receive a bin therein, the console side wall including a top edge configured to define an included angle relative to the bin top edge;
   a bin defined by a floor and a bin side wall having a top edge including a pair of opposed strikers; and
   a hinged bin lid having a dual pawl latching mechanism disposed on a bottom surface thereof and including a pair of opposed bin lid side walls;
   wherein the dual pawl latching mechanism does not extend beyond an exterior dimension defined by the bin lid and bin lid side walls.

9. The assembly of claim 8, wherein the latching mechanism is disposed on the bin lid bottom surface whereby a gap is defined between an outer portion of the latching mechanism and an inner portion of the opposed bin lid side walls.

10. The assembly of claim 9, wherein the gap is dimensioned to snugly receive the bin top edge therein whereby the dual pawls engage the opposed strikers when the bin lid is translated to a closed configuration.

11. The assembly of claim 8, wherein the bin lid side walls are configured to define a same included angle as the console side wall top edge included angle.

12. The assembly of claim 11, wherein the console side wall defines a mating surface for the bin lid side walls.

13. A vehicle including the assembly of claim 8.

* * * * *